Figure 1:
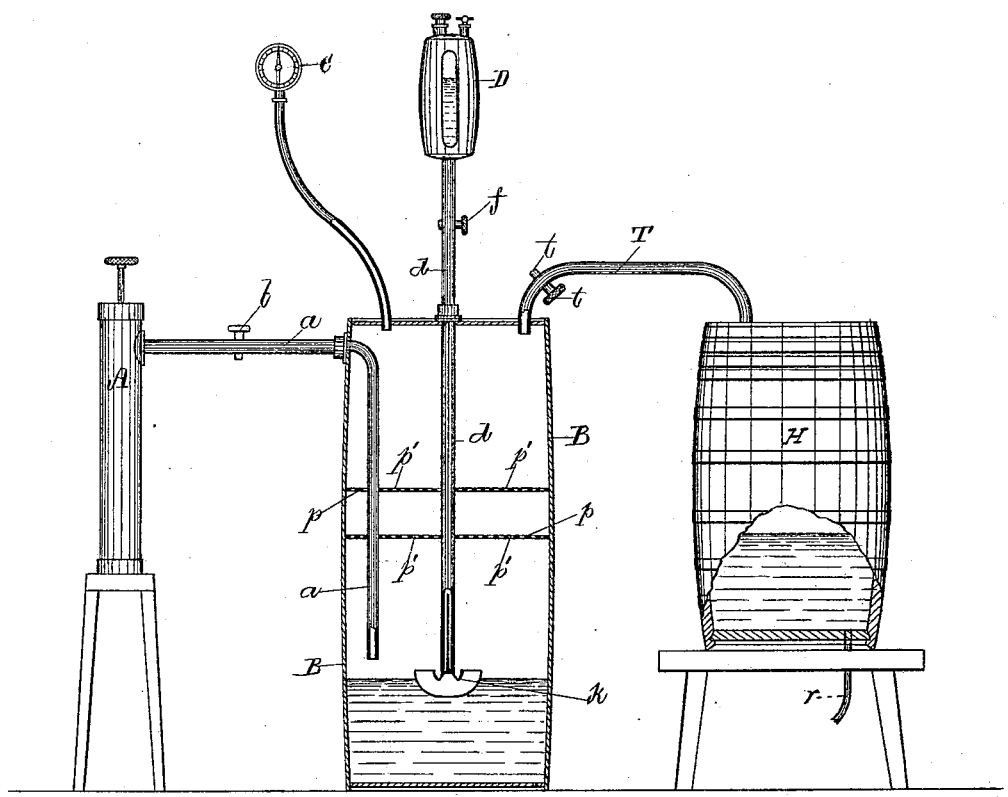

(No Model.)

C. E. HAYNES.
APPARATUS FOR PRESERVING BEER AND OTHER ALCOHOLIC LIQUORS.

No. 298,578. Patented May 13, 1884.

Witnesses.
Robert Wallaer
Reginald Gray

Inventor.
Cornelius E. Haynes
by Wm R Macleod
his atty

UNITED STATES PATENT OFFICE.

CORNELIUS E. HAYNES, OF BOSTON, MASSACHUSETTS, ASSIGNOR OF ONE-HALF TO DANIEL C. KNOWLTON, OF SAME PLACE.

APPARATUS FOR PRESERVING BEER AND OTHER ALCOHOLIC LIQUORS.

SPECIFICATION forming part of Letters Patent No. 298,578, dated May 13, 1884.

Application filed December 10, 1883. (No model.)

*To all whom it may concern:*

Be it known that I, CORNELIUS E. HAYNES, of Boston, county of Suffolk, State of Massachusetts, am the inventor of a new and useful Improvement in Apparatus for Preserving Beer and other Alcoholic Liquors, of which the following is a full, clear, concise, and exact description, taken in connection with the drawing accompanying and forming a part hereof, in which—

The figure is a central sectional view of the receiver, with the other parts of the apparatus attached.

I will describe my invention, using letters of reference to the drawing.

A is an air-pump of common construction, which is connected by means of a tube, $a$, with the vessel or chamber B, the discharge end of the tube being situated well down in the receiver and near the surface of the liquid which the receiver contains. The tube $a$ may be closed by means of the faucet $b$. The vessel B contains, below the lower end of the tube $d$, a quantity of alcohol, preferably of about ninety-two per cent. strength. The space above the alcohol is filled with compressed air, supplied through the tube $a$ by means of the air-pump A. To indicate the density of the volume of air in the receiver a gage, C, of common construction is provided. The alcohol is supplied to the receiver B from a vessel, D, situated above the receiver, and connected therewith by the tube $d$, which extends through the top of the receiver and down to a point near the level of the surface of the alcohol. The tube $d$ is provided with a faucet, $f$, at a point between the alcohol-supply vessel D and the receiver B for the purpose of closing the tube whenever necessary, as when the supply-vessel is being replenished. The lower end of the tube $d$ is fitted with a float-valve, $k$, which, as the alcohol in the receiver diminishes in volume, falls, thus opening the end of the tube and permitting fresh alcohol to pass into the receiver until the amount in the receiver is increased sufficiently to raise the float and close the valve. Partitions $p$ $p$, perforated at intervals, as shown at $p'$ $p'$, are placed horizontally in the air-space of the receiver, to act as a brake on the passage of the alcoholic vapor into the upper part of the receiver. The upper part of the receiver is provided with a tube, T, by which it may be connected with the keg or other vessel containing the beer or alcoholic liquor which is to be preserved. This tube is fitted with a faucet, $t$, by which it may be closed while being attached to a fresh keg of beer.

H represents the keg of beer, and $r$ the pipe by which it is drawn off.

It is well known that beer in kegs loses its freshness if the pressure be taken off, and consequently a partially-empty keg, if allowed to stand even a short time, has a flat taste not desirable. The inside of beer-kegs also becomes sour after the beer is drawn off, and requires to be thoroughly cleansed and sweetened before the keg is again used.

To keep the beer or other alcoholic liquor fresh throughout, and at all times, regardless of whether the keg has been standing partially empty for a considerable time or not, as well as to keep the kegs sweet, are the chief objects of my invention. These objects are accomplished by the use of the apparatus shown and above described, and the manner of using the apparatus is as follows: If the tube T is not connected with a keg or other vessel containing the liquor, the faucet $t$ should be turned to close the tube. To charge the apparatus the tube $d$ is closed by means of faucet $f$ and the vessel D is filled with alcohol. If the faucet $f$ be now opened, the alcohol will discharge into the lower part of the receiver B until the float-valve $k$, rising as the alcohol rises in the receiver, automatically closes the supply-tube. It will be seen that the vessel D, being supplied with alcohol and the faucet $f$ being open, the float-valve $k$ insures a constant and uniform supply of alcohol in the receiver. The faucet $b$ being open, the air-pump A is operated, and air is forced into the receiver until the gage C indicates a proper amount of pressure, when the faucet $b$ is closed. The pressure required will vary according to the length of the connections used and the number of kegs connected with the receiver at one time. When thus charged, the upper part of the receiver is filled with compressed air charged with the vapor of alcohol. If, now, connection be made with a keg of beer or other liquor, and the faucet $t$ opened, the air and vapor pass to the keg, maintaining the pressure in it, (which ordinarily decreases as it is emptied,) and keep the upper part of the keg filled with alcoholic vapor, which preserves and benefits the stock of the liquor, and prevents acidity and the undesirable flat taste which beer particularly is liable to have when allowed to stand in a partially-empty keg. It will be obvious that by using a considerable pressure I can very materially increase the per cent. of alcohol in poor liquor of low grade, thus improving its stock and quality.

The apparatus may be made of any suitable material; but I prefer to make the receiver of copper, tin-lined.

What I claim is—

1. The combination of the air-pump and its discharge-tube, the receiver B, the alcohol-supply vessel D, the discharge-tube $d$, provided with a float-valve, and a pipe for connecting the receiver with a vessel containing the liquor to be preserved, substantially as set forth.

2. The combination as a whole, consisting of the air-pump and its discharge-tube, the receiver provided with the perforated partitions $p\ p$, and the alcohol-supply vessel and its discharge-tube, provided with the float-valve $k$ and the connecting-pipe T, by which the apparatus is connected with the keg, substantially as described and shown.

CORNELIUS E. HAYNES.

Witnesses:
   WM. A. MACLEOD,
   ROBERT WALLACE.